United States Patent [19]

Oberle, Jr.

[11] Patent Number: 5,380,481
[45] Date of Patent: Jan. 10, 1995

[54] PROCESS FOR THERMOFORMING MULTILAYER SHEETS

[75] Inventor: William A. Oberle, Jr., Newark, Del.

[73] Assignee: E. I. Du Pont de Nemours and Company, Wilmington, Del.

[21] Appl. No.: 65,733

[22] Filed: May 21, 1993

[51] Int. Cl.⁶ .............................................. B29C 51/00
[52] U.S. Cl. .................................. 264/510; 264/512; 264/549; 264/550
[58] Field of Search ............... 264/512, 547, 549, 544, 264/550, 551, 510, 40.3; 425/145, 146

[56] References Cited

U.S. PATENT DOCUMENTS

| | | | |
|---|---|---|---|
| 4,421,712 | 12/1983 | Winstead | 264/551 |
| 4,990,562 | 2/1991 | Chou et al. | 525/58 |
| 5,198,175 | 3/1993 | Kato et al. | 264/512 |
| 5,283,029 | 2/1994 | Ellemor | 264/544 |

FOREIGN PATENT DOCUMENTS 53-049050 10/1985 Japan.

Primary Examiner—Christopher A. Fiorilla

[57] ABSTRACT

A process for thermoforming a sheet, involving a static back-pressure which initially increases substantially continuously, then decreases substantially continuously, during the thermoforming operation. The back-pressure is preferably controlled by a pressure release valve.

5 Claims, 1 Drawing Sheet

PROCESS FOR THERMOFORMING MULTILAYER SHEETS

FIELD OF THE INVENTION

The present invention relates generally to a process for thermoforming containers, particularly containers which comprising ethylene vinyl alcohol ("EVOH") barrier resin, particularly EVOH resins comprising minor amount of polyamide. More specifically, the present invention is directed to an innovative thermoforming process comprising an ascending/descending backpressure profile.

BACKGROUND OF THE INVENTION

Generally speaking, ethylene-vinyl alcohol copolymer ("EVOH") is a popular thermoplastic, due to its gas barrier properties and excellent resistance to organic liquids. However, EVOH does not readily thermoform at the relatively lower temperatures required for thermoforming of many common structural materials, due to undesirable cracking, uneven stretching and the like, particularly at large depths of draw.

Blends of ethylene vinyl alcohol polymers with polyamides in general are known, and have been used in packaging applications as barriers to inhibit the passage of atmospheric oxygen or other gases. Japanese patent application No. 53-49050 discloses a blend of EVOH with 5-40 weight percent polyamide. The polyamides include a copolymer of hexamethylene diamine with isophthalic and terephthalic acids, in mole ratios of 100/0 to 50/50. The blend is formed into a film, which is said to possess excellent gas barrier properties. U.S. Pat. No. 4,990,562 is directed to blends of a major portion of EVOH and a minor portion of amorphous polyamide and preferably also a semicrystalline nylon. However, the blends discussed in the above references do not thermoform very readily at large depths of draw (showing cracks or uneven stretching in parts of the container), using conventional thermoforming processes. The present invention is directed to an innovative process for thermoforming EVOH containers at relatively large depths of draw without many of the problems otherwise commonly associated with such processes.

SUMMARY OF THE INVENTION

The present invention is directed to the use of multilayer films, preferably comprising at least one EVOH barrier layer and at least one structural layer. In the most preferred embodiment, the multilayer film is thermoformed to a depth of draw corresponding to a draw ratio greater than about 1 and more preferably in the range of about 1.5 to about 5.

The composite, multilayer film can be thermoformed using conventional or non-conventional thermoforming equipment, provided that, as the multilayer film is pushed and stretched on one side of the film (hereafter referred to as the "forming-pressure"), a pressure profile on the opposite side of the film is maintained (the pressure on the opposite side of the film will hereafter be referred to as "back-pressure"and comprises both the introduced pressure and the downstroke pressure).

In the most preferred embodiment, the back pressure profile is adjusted and maintained by controlled release of pressure within the mold or die. The back-pressure is preferably maintained by means of a controlled release valve in communication with the mold or die cavity.

The forming-pressure divided by back-pressure (hereafter, "F/B pressure ratio") preferably increases substantially continuously from about 1.0 at the beginning of the thermoforming step to about 1.3-1.5 at about 1/10th (more preferably ¼ and yet more preferably ⅓) to about 9/10th's (more preferably about ¾, yet more preferably about ⅔) of the final depth of draw, and at this point, the F/B pressure ratio decreases substantially continuously until it reaches about 1.2 to about 1.0 at full depth of draw. The forming-pressure range preferably peaks at about 15-20 psig (more preferably 18-20 psig) and the back-pressure range preferably peaks at about 5-15 psig (more preferably 7-14 psig).

In the most preferred embodiment, multiple thermoforming is done simultaneously on a single sheet, with each thermoforming operation in close proximity to the others. Preferably, the perimeter defined by the outermost edges of the thermoforming mechanisms defines a sheet area in which the area of sheet actually being thermoformed divided by the sheet area not being thermoformed (prior to actual thermoform stretching) is greater than 1, more preferably greater than about 3 and most preferably greater than about 5. The back-pressure profile of the present invention allows intensive, simultaneous, multiple thermoforming of a single sheet, which provides an advantageous, high speed, low cost, low scrap rate process.

DETAILED DESCRIPTION OF THE PREFERRED EMBODIMENT AND BEST MODE

Introduction

Figure 1:
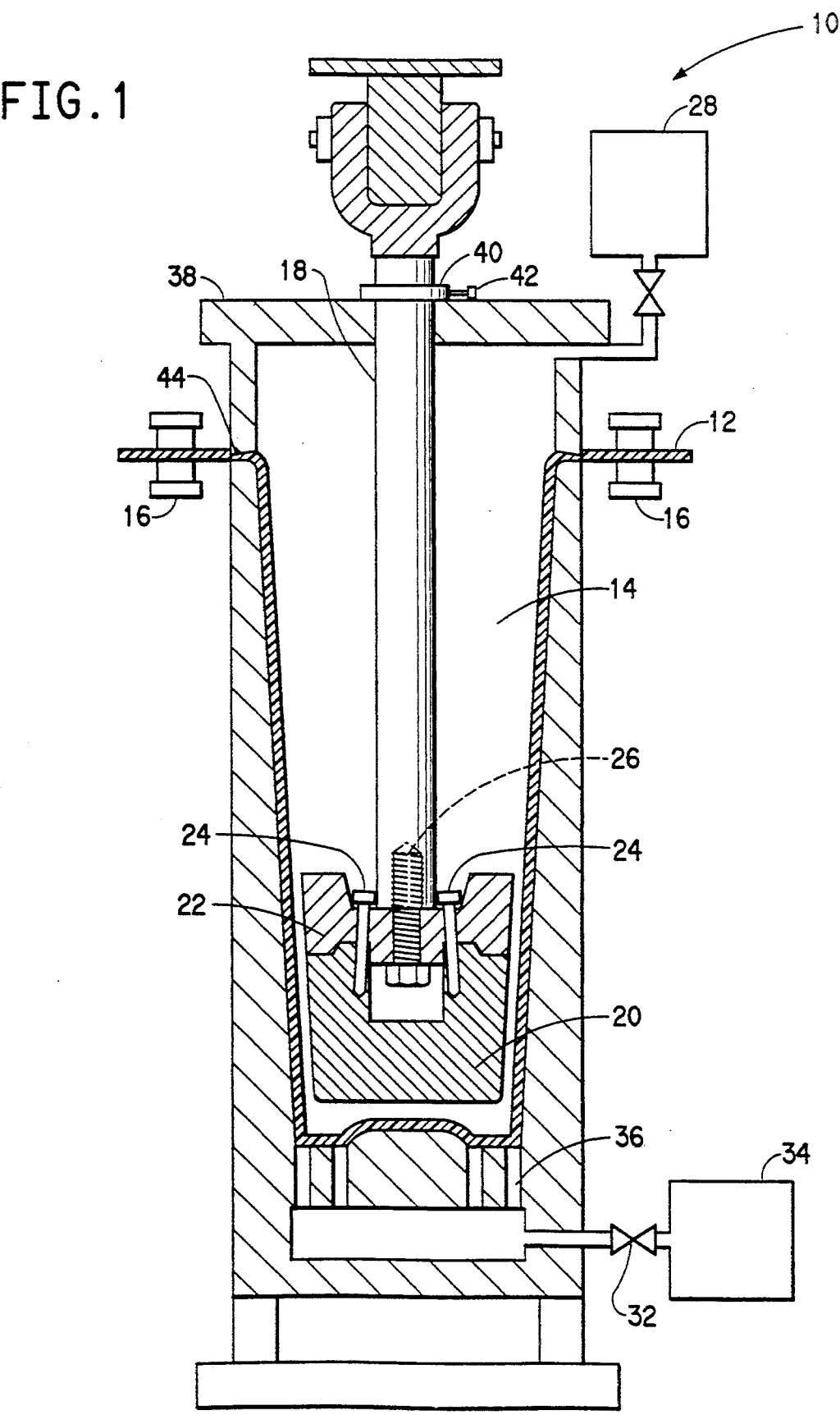
FIG. 1 is a cut-away, perspective view of a preferred thermoforming process of the present invention.

Each preferred element of the present invention will be discussed in detail below. Thereafter the preferred combinations of these elements will be described.

Barrier Layer: Overview

Useful barrier resins for the present invention include those comprising:

1. about 50-95 wt % EVOH, more preferably about 65-90 wt % EVOH and most preferably about 70-85 wt % EVOH;

2. about 5 to about 50 wt % amorphous polyamide, more preferably about 10-35 wt % and most preferably 15-30 wt %; and 3. about 0-45 weight percent, more preferably about 0.1 to about 10 weight percent, and most preferably about 1-5 wt % other conventional polymers or additives commonly used in barrier resins, such as, grafted olefinic polymers or copolymers, conventional lubricants, plasticizers, fillers, pigments, release agents, antioxidants and the like.

Barrier Layer: EVOH Component

The EVOH copolymer preferably comprises about 20-55 mole percent ethylene units, more preferably about 25 to 50 mol % ethylene. If the ethylene percentage is less than this range, moisture resistance generally decreases and this can lead to poor gas barrier properties under high-humidity conditions. If the ethylene percentage is above the preferred range, gas barrier properties generally diminish under low-humidity conditions, although moisture resistance is generally improved.

The vinyl acetate component (of the EVOH) should have a degree of saponification of at least about 90 mol %, preferably greater than 95 mol % and most preferably greater than about 98 mol %. Generally, if the mole percent saponification is less than about 95 mol %, the copolymer exhibits reduced thermal stability and gelation may occur at the time of extrusion (and can also exhibit poor gas barrier properties).

The EVOH copolymer should have an intrinsic viscosity in the range of about 0.001 to about 10 l/g as measured in a mixed solvent composed of 85 wt % of phenol and 15 wt % of water at 30° C. However, with an intrinsic viscosity lower than 0.07 l/g, the copolymer generally exhibits poor mechanical properties, and with an intrinsic viscosity higher than 0.17 l/g, the copolymer may gel at the time of melt forming.

Barrier Layer: Polyamide Component

The polyamide component comprises up to about 50% by weight of the barrier layer (above about 50 wt % polyamide, the oxygen barrier properties of the layer tend to diminish); more preferably, the polyamide component comprises from about 10 to about 35 wt % of the barrier layer and most preferably about 15 to 30 wt % of the barrier layer. The polyamide generally contributes to the overall toughness and thermoformability of the barrier layer.

The polyamide component can be an amorphous polyamide, a semicrystalline polyamide or it can be a blend of amorphous polyamide containing a certain amount of semicrystalline polyamide. Amorphous polyamides include those amorphous polymers prepared from the following diamines: hexamethylenediamine, 2-methylpentamethylenediamine, 2,2,4-trimethylhexamethylene-diamine, 2,4,4-trimethylhexamethylene-diamine, bis(4-aminocyclohexyl)methane, 2,2-bis(4-aminocyclohexyl)iso-propylidine, 1,4-diaminocyclohexane, 1,3-diaminocyclohexane, meta-xylylenediamine, 1,5-diamino-pentane, 1,4-diamino-butane, 1,3-diaminopropane, 2-ethyldiaminobutane, 1,4-diaminomethylcyclohexane, p-xylylene-diamine, m-phenylene-diamine, p-phenylenediamine, and alkyl substituted m-phenylenediamine and p-phenylenediamine.

Examples of useful polyamides include those amorphous polymers prepared from the following dicarboxylic acids: isophthalic acid, terephthalic acid, alkyl substituted iso- and terephthalic acid, adipic acid, sebacic acid, butane dicarboxylic acid and the like.

Polyamides prepared from aliphatic diamines with aliphatic diacids are the traditional semicrystalline nylons (also referred to as crystalline nylons) and are not amorphous polyamides. Polyamides prepared from aromatic diamines and aromatic diacids are also known. However, a certain of these all-aromatic polyamides are known to be intractable under ordinary melt processing conditions, and thus are not normally suitable. Thus the preferred amorphous polyamides are those in which either the diamine or the diacid moiety is aromatic, and the other moiety is aliphatic.

The aliphatic groups of these polyamides preferably contain 4-8 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms.

However, not all of these aromatic/aliphatic combinations will necessarily provide suitable amorphous polyamides. For example, specifically metaxylylenediamine adipamide is not generally suitable for this invention. This polymer readily crystallizes under heating conditions typical for thermoforming operations, and also crystallizes upon orienting. This illustrates the fact that it is important to determine that a particular polyamide is in fact amorphous, and not to rely solely on the chemical structure of the polymer. This determination can easily be made by differential scanning calorimetry.

Specific examples of amorphous polyamides which are suitable for this invention include: hexamethylenediamine isophthalamide, hexamethylenediamine isophthalamide/terephthalamide terpolymer, having iso/terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediamine with iso- or terephthalic acids, or mixtures of these acids. Polyamides based on hexamethylenediamine iso/terephthalamide containing high levels of terephthalic acid moiety may also be useful provided a second diamine such as methyldiaminopentane is incorporated to produce a processible amorphous polymer.

The amorphous polyamide component can also include one or more semicrystalline polyamides in an amount of up to about 100 percent, more preferably up to about 70% and yet more preferably about 20 to about 40 percent, based on the polyamide component. Semicrystalline polyamides are the traditional semicrystalline nylons, which are generally prepared from lactams or amino acids, such as nylon 6 or nylon 11, or from condensation of diamines such as hexamethylene diamine with dibasic acids, such as succinic, adipic, or sebacic acids.

Copolymers and terpolymers of these polyamides are also included, such as copolymer of hexamethylenediamine/adipic acid with caprolactam (nylon 6,66). Blends of two or more crystalline polyamides can also be used. The optional semicrystalline nylon should preferably be of a type which is miscible with the EVOH component, as evidenced by the presence of a single glass transition temperature or a depressed melting point as measured by DCS. Examples of suitable semicrystalline nylons include nylon 6, nylon 66, nylon 6,66, and copolymers of nylon 6 and 12. The polyamide of the present invention, both semicrystalline and amorphous, are prepared by condensation polymerization, which is well known to those skilled in the art.

Barrier Layer: EVOH+Polyamide

The barrier layers of the present invention may be prepared by blending techniques well known in the art, including the use of single or twin screw melt processors or extruders. Blending is performed at temperatures sufficiently high to form a uniform melt of the components to be blended, typically about 200° C. to about 225° C. The molten blend is then preferably extruded into a film format by conventional means.

Included in the composition may be about 0 to 40%, more preferably about 0.1 to 10% and yet more preferably about 1–5% other conventional polymers or additives, etc. Grafted olefinic polymer or copolymer can be a grafted polyolefin polymer or copolymer, such as high density polyethylene, grafted linear low density polyethylene, grafted low density polyethylene, grafted middle density polyethylene, grafted ethylene/propylene copolymer, grafted polypropylene, grafted EPDM or a copolymer of ethylene with one or more vinyl ester monomer or acid derivative thereof; more specific examples of such grafted polylefin polymer or copolymers include polypropylene grafted with maleic anhydride, ethylene/n-butylacrylate/carbon monoxide grafted with maleic anhydride, or ethylene/vinyl acetate grafted with maleic anhydride.

Structural Layer

The structural layer(s) is(are) preferably used to enclose the EVOH and protect it from ambient conditions, particularly moisture, while also providing the final film with strength and structural integrity. Hence, the structural layer resin should have low moisture vapor permeability and excellent toughness. Preferred structural resins of the present invention include: polyethylene, polypropylene, ethylene-propylene copolymer, ethylene-vinyl acetate copolymer, thermoplastic polyester (e.g., polyethylene terephthalate), polyamide resins (e.g., 6-nylon and 6,6-nylon), polystyrene, polyvinyl chloride, polycarbonate, and the like. Preferred structural layers comprise polypropylene, polyethylene, ethylene-propylene copolymer, thermoplastic polyester, and/or polystyrene.

Barrier Layer + Structural Layer

The laminates of the present invention may have any one of the following structures:

a. barrier layer/structural layer,
b. structural layer/barrier layer/structural layer,
c. structural layer/barrier layer/structural layer/barrier layer/structural layer;
d. structural layer/barrier layer/barrier layer/structural layer; and
e. combinations, derivations or multiples of the above.

In many cases, an adhesive layer is also interposed between the barrier layer and the structural layer.

Although a single barrier layer and single structural layer would be appropriate for the present invention, more preferably, a barrier layer is placed between two structural layers (the structural films can be the same or different). The laminate should have a thickness in the range of about 6–120 mils, more preferably in the range of about 40–60 mils. The barrier layer(s) should have a thickness of at least about 2 mils, more preferably at least about 4 mils. Preferably, the thickness of the barrier layer(s) should be about 2.5–15% of the overall thickness of the sheet or film, more preferably about 5–10%.

The laminate may be formed by any known method such as coextrusion, coinjection, extrusion lamination, and coating (i.e. coating the structural layer with a barrier resin solution or coating the barrier layer with a structural layer solution). In the case of coextrusions, multiple extruders are preferably used, one for each barrier layer, and others for each structural (and adhesive, if any) layer. The extrudates from the extruders are preferably combined together in a coextrusion die (T-die or inflation die) which then forms the laminate. Alternatively, the film layers can be fused together using heat or more preferably, held together by any one of a variety of adhesive resins.

In general, adhesive resins for tying film layers together are thermoplastic polymers having carbonyl groups derived from functional groups of free carboxylic acids, carboxylic acid salts, carboxylic acid esters, carboxylic acid amides, carboxylic anhydrides, carbonic acid esters, urethanes, ureas or the like.

In these thermoplastic polymers, the carbonyl group concentration may be changed in a broad range, but in general, it is preferred to use a thermoplastic polymer containing carbonyl groups at a concentration of 10 to 1400 millimoles per 100 g of the polymer. Suitable adhesive resins include polyolefins modified with at least one ethylenically unsaturated monomer selected from unsaturated carboxylic acids and anhydrides, esters and amides thereof, especially polypropylene, high density polyethylene, linear low density polyethylene, very low density polyethylene, ethylene-acrylate, ethylene acid copolymers, low density polyethylene and ethylene-vinyl acetate copolymers modified with at least one member selected from acrylic acid, methacrylic acids, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, fatty acid amides, and imides of the acids described above.

The adhesive can also be prepared from an ethylene polymer and a second polymer grafted with maleic anhydride. In addition, as the adhesive resin, there can be used ethylene-acrylate copolymers, ionomers, ethylene-propylene, and ethylene-propylene-diene, polyalkylene oxide-polyester block copolymers, carboxymethyl cellulose derivatives, and blends of these polymers with polyolefins.

Thermoforming

The present invention is particularly useful for deep-drawn containers having a draw ratio greater than about 0.5, especially in the range of about 0.8 to 5, more preferably about 1.5–4. The deep-drawn containers (typically, cup-like containers) are preferably produced by draw forming, air-pressure forming, vacuum forming, or plug-assist forming at a stretching temperature of the laminate (generally in the range of about 210°–370° F., preferably 230°–360° F., more preferably 295°–310° F. and most preferably about 302°–308° F.). Plug assist forming is most preferred, particularly at a plug temperature of about 250°–300° F., most preferably about 290° F.

Regardless of the type of thermoforming, critical to the present invention is that a particular back-pressure profile be maintained. Back-pressure is the pressure which resists the movement of the sheet during the thermoforming operation and includes both the introduced pressure and the downstroke pressure and will generally peak at about 7–14 psig. Forming-pressure is the pressure on the opposite side of the sheet which substantially assists or causes the thermoforming of a portion of the laminate sheet and will generally peak at about 18–20 psig.

The forming-pressure divided by back-pressure (hereafter, "F/B pressure ratio") preferably increases substantially continuously from about 1.0 at the beginning of the thermoforming step to about 1.3–1.5 at about 1/10th (more preferably ¼ and yet more preferably ⅓) to about 9/10ths (more preferably about ¾, yet more preferably about ⅔) of the final depth of draw, and at this point, the F/B pressure ratio decreases substantially continuously until it reaches about 1.2 to about 1.0 at full depth of draw.

In the most preferred embodiment, multiple thermoforming is done simultaneously on a single sheet, with each thermoforming operation in close proximity to the others. The back-pressure profile of the present invention allows such intensive, simultaneous, multiple thermoforming of a single sheet. Hence, the processes of the present invention, are capable of high speed, low scrap, low cost production of EVOH containing containers.

Referring now to the drawing, FIG. 1 illustrates a preferred thermoforming process, shown generally at 10. A sheet of laminate 12 heated to a deformable condition (generally about 305° F.) using conventional heating means (not shown), such as temperature controlled upper and lower ceramic heater ovens. After heating, the laminated is conveyed and positioned over die cavity 14 where it is then secured in place by clamps 16. The clamps prevent the laminate sheet from moving during the thermoforming process.

Once the laminate is heated to its thermoforming temperature, softened and secured over the die cavity, the drive shaft 18 drives the plug 20 onto the laminate, driving (i.e., stretching) it into the die cavity (as can be seen from the Figure, plug 20 is secured to a collar 22 by a fastener means 24, and this collar is fastened to the drive shaft by a bolt 26). The mold cavity 14 is stationary and defines a depth of draw greater than about 0.5 and most preferably about 3.

As the plug is moved down into the mold cavity, compressed air is supplied from compressor 28, whereby the compressed air enters the die cavity above the laminate sheet through pressure control valve 30. Pressure within the die cavity below the laminate sheet is controlled by valve 32 which is in communication with the bottom of the die cavity by means of pressure release portals 36. Valve 32 can be vented to the atmosphere, but more preferably is a connected to a pressure device 34 which is capable of providing compressed air or a vacuum. In this way, valve 32 can be used to meticulously control the pressure in the die cavity below the laminate sheet.

As the plug 20 reaches the bottom of its stroke, ring 40 (which is secured to the drive shaft by fastener 42) engages the top of upper housing 38, causing the bottom edge 44 to cut the laminate along it periphery at the opening of the die cavity. Then, after thermoforming, when the plug 20 and the upper housing 38 are separated from the thermoformed article, the thermoformed container can be popped out of the die cavity by means of positive pressure through portals 36. Alternatively, a pin (not shown) can be incorporated into the die cavity which is retracted during thermoforming but which extends and pops the thermoformed article out of the die cavity after thermoforming.

By adjusting the pressure above the laminate using control valve 30 and by adjusting the pressure below the laminate using control valve 32, the ascending/descending backpressure profile described above (and defined in the claims) is readily achievable.

What is claimed is:

1. A process for thermoforming a multilayer sheet, said process comprising the steps of:
    heating the sheet to its thermoforming softening temperature, thereby creating a softened sheet;
    beginning a thermoforming step by forcing a portion of the softened sheet into a die cavity by means of a forming pressure, thereby creating a movement into the cavity by the softened sheet; and
    resisting the movement of the softened sheet into the die cavity by means of a static back-pressure substantially within the die cavity, the back-pressure being regulated by a controlled release of pressure from the die cavity due to a venting mechanism in communication with the die cavity;
    whereby the pressure ratio of the formings pressure divided by the back-pressure increases substantially continuously from about 1.0 at said beginning of the thermoforming step to about 1.3 to about 1.5 at about 1/10th to about 9/10ths of a final depth of draw, and then, the pressure ratio of the forming pressure divided by the back-pressure decreases substantially continuously until it reaches about 1.2 to about 1.0 at the final depth of draw.

2. A process in accordance with claim 1 wherein the pressure ratio of the forming pressure divided by the back-pressure increases substantially continuously from about 1.0 at the beginning of the thermoforming step to about 1.3-1.5 at about ¼ to about ¾ of the final depth of draw.

3. A process in accordance with claim 1, wherein the forming pressure increases to a maximum pressure within a range of about 15-20 psig and the back-pressure increases to a maximum pressure within a range of about 7-15 psig.

4. A process in accordance with claim 1 wherein the forming pressure is substantially created by a pressurized gas in combination with a mechanical plug.

5. A process in accordance with claim 4, wherein the sheet comprises ethylene vinyl alcohol.

* * * * *